No. 876,244.
PATENTED JAN. 7, 1908.
N. A. SHIGON.
CHUCK.
APPLICATION FILED FEB. 6, 1907.
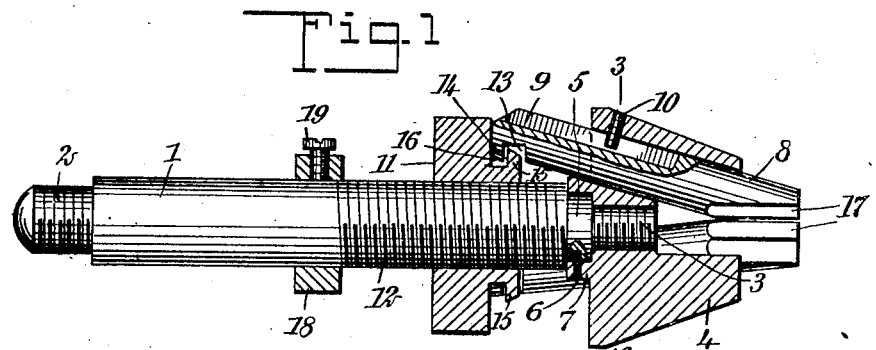
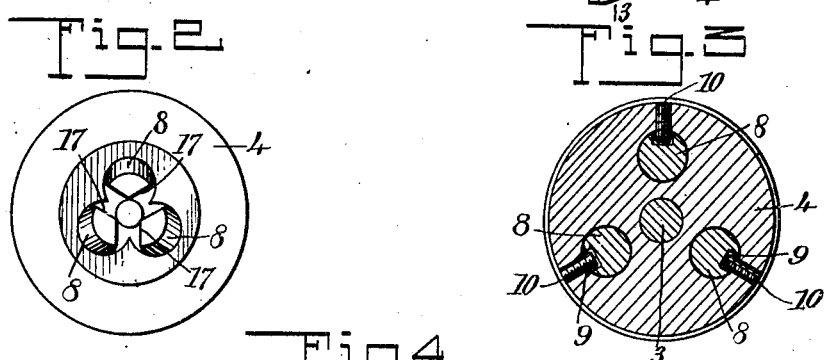
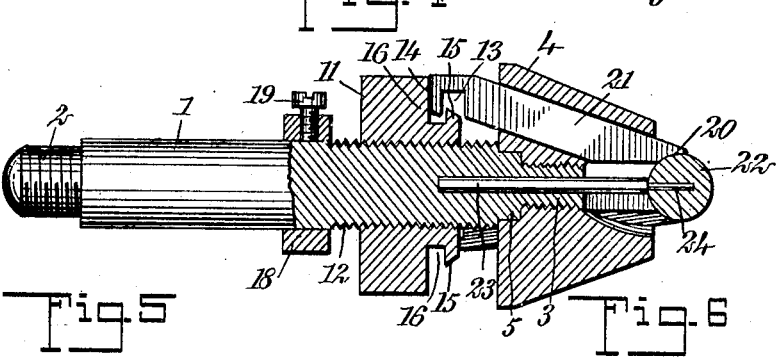
WITNESSES
INVENTOR
Nathan A. Shigon
BY
ATTORNEYS

UNITED STATES PATENT OFFICE.

NATHAN A. SHIGON, OF NEW YORK, N. Y.

CHUCK.

No. 876,244.  Specification of Letters Patent.  Patented Jan. 7, 1908.

Application filed February 6, 1907. Serial No. 356,018.

*To all whom it may concern:*

Be it known that I, NATHAN A. SHIGON, a citizen of the United States, and a resident of the city of New York, borough of Manhattan, in the county and State of New York, have invented a new and Improved Chuck, of which the following is a full, clear, and exact description.

This invention relates to chucks designed especially for jewelers' use, although capable of general application.

The primary purpose of the invention consists in providing a chuck with detachable jaws having special clamping ends adapted to hold objects of various shapes, and thereby enable the jaws most suitable for a particular purpose to be applied to the chuck when desired, and removed at will to make place for others.

Other objects relating to the special construction and arrangement of the several parts will be understood from the following description and accompanying drawings, in which drawings Figure 1 is a side elevation, partly in section, of a device embodying my invention; Fig. 2 is an end view of the device shown in Fig. 1; Fig. 3 is a vertical section taken on the line 3—3 of Fig. 1; Fig. 4 is a vertical section partly in side elevation, of a device embodying a modification of my invention; Fig. 5 is an end view of the device shown in Fig. 4; and Fig. 6 is an end view of a chuck having a modified form of jaw.

As illustrated in the drawings, 1 represents a shank, partly plain and partly threaded, having one of its ends 2 threaded to engage the head of a lathe. The opposite end 3 of the shank is reduced and threaded so as to engage the head 4 of the chuck. A shoulder 5 is formed on one end of the shank adapted to receive set-screws 6 which also engage a flange 7 formed on the head of the chuck, and thereby hold the head against rotary motion on the shank. The head of the chuck is provided with recesses inclined to the axial line of the head and the shank of the chuck, and adapted to receive jaws 8 which are preferably circular in outline and have a sliding engagement with the recesses of the head. The jaws when circular in outline are provided with longitudinal grooves 9 adapted to receive the ends of set screws 10 which have a threaded engagement with the head of the chuck, and thereby prevent the jaws from turning in their sockets.

The rear ends of the jaws have a detachable engagement with a nut 11 which is threaded interiorly to engage a thread 12 formed on the shank of the chuck. To this end the inner ends of the jaws are provided with recesses 13 and lips 14 adapted to engage respectively an annular groove 16 and flange 15 formed on said nut. The flange 15 is of smaller diameter than the body of the nut 11, so that while said flange engages the recesses 13 of the jaws of the chuck, the rear ends of said jaws bear against the forward face of the body of the nut. When the jaws are inserted in the head of the chuck the rear ends of the jaws bear against the forward face of the nut, which moves the jaws inward together, thereby keeping the recesses 13 in line with each other and with said flange at all times and enabling said recesses to engage the flange 15 of the nut evenly and simultaneously. In grasping an object, moreover, the outward pressure on the rear end of the jaws is exerted by the body of the nut, thereby enabling the body of the nut to take up said strain, while the flange 15 is used only for the purpose of retracting the jaws in the head of the chuck. The forward ends of the jaws are varied in construction in order to hold objects of different shape. As shown in Fig. 1, the inner or clamping faces 17 of the jaws are beveled, so that when said ends of the jaws are closed the faces thereof are in contact with each other throughout their entire extent. A collar 18 is mounted upon the shank 1 and held thereon by means of a set screw 19, so as to enable the collar 18 to be moved along the shank, the nut 11 to be retracted from the ends of the jaws and the jaws to be removed from the head when desired.

Instead of using jaws having clamping faces of the character shown in Figs. 1 and 2, the grasping surfaces of the jaws may be cut away on a circular line, as shown in Fig. 6, so as to grasp a larger object than can be held by the jaws shown in Figs. 1 and 2, and in addition to such construction it is desirable to use jaws adapted to hold a spherical object. For this purpose the clamping ends of the jaws are made so as to flare outwardly, as indicated by the faces 20 of the jaws 21, shown in Fig. 4, and curved longitudinally and transversely so as to attain a firm, even hold upon a spherical object 22. In working spherical objects it frequently becomes necessary to bore a hole through their center.

The hole may first be bored half-way through the object, which may then be released from the jaws of the chuck and a center pin 23 having a reduced end 24, placed in a suitable aperture in the shank of the chuck. The drill may then be applied to the opposite side of the object, which is thereby automatically centered, and the remaining portion of the hole drilled in line with the preceding portion. Such a device is of special value in drilling pearls and other objects of like character.

Other forms than those shown herein may obviously be applied to the clamping ends of the jaws if desired. While in most instances I prefer to make the jaws circular in outline, as already described and shown in Fig. 1, they may be made angular in cross section, as indicated by the jaws 21 of Fig. 4, without departing from my invention. In such cases the jaws are held against rotary movement on the head of the chuck because of their shape, and the recesses 9 and engaging set screws 10 used with cylindrical jaws are not required.

I do not desire to be limited to the specific construction or arrangement of the respective parts by which the rear ends of the jaws are held in engagement with the nut 11. Other means having similar capabilities may be used without departing from my invention.

Having thus described my invention, what I claim as new and desire to secure by Letters Patent is:—

A chuck comprising a shank, a head mounted thereon and provided with inclined sockets, jaws slidingly mounted in said sockets, inclined to the axial line of said shank and provided on the inner sides of their rear ends with recesses, and a nut having a threaded engagement with said shank adapted to bear with its face against the end of said jaws, and provided with a flange smaller in diameter than that of the body of the nut, off-set from said body, and adapted to engage the recesses of said jaws.

In testimony whereof I have signed my name to this specification in the presence of two subscribing witnesses.

NATHAN A. SHIGON.

Witnesses:
ROBERT W. HARDIE,
JNO. M. RITTER.